United States Patent Office 3,505,454
Patented Apr. 7, 1970

3,505,454
INSECTICIDAL COMPOSITION AND METHOD
CONTAINING 1,2,4-OXADIAZOLIDINE
John Krenzer, Oak Park, Ill., assignor to Velsicol Chemical Corporation, Chicago, Ill., a corporation of Delaware
No Drawing. Filed Nov. 29, 1967, Ser. No. 686,774
Int. Cl. A01n 9/22, 9/28
U.S. Cl. 424—272                                    8 Claims

ABSTRACT OF THE DISCLOSURE

A new insecticidal composition comprising an inert carrier and, as an essential active ingredient, in a quantity toxic to insects, a compound of the formula

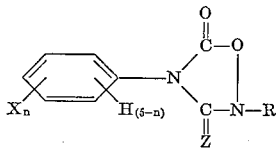

wherein R is selected from the group consisting of lower alkyl, lower alkenyl and substituted lower alkyl wherein the substituent is a radical selected from the group consisting of halogen, lower alkoxy, benzyl, lower alkanoyl, carboxyalkyl and cyclohexyl; Z is selected from the group consisting of oxygen and sulfur; X is selected from the group consisting of halogen, lower alkyl, lower alkenyl, nitro, lower alkoxy, lower haloalkyl, di-(lower alkyl) amino, acylamino, N-lower alkyl-N-lower acylamino, lower alkylsulfoxide, lower alkylsulfone, cyano, thiocyano; and $n$ is an integer from 0 to 3. A method for destroying insects which comprises applying to said insects an insecticidal composition comprising an inert carrier and, as an essential active ingredient, in a quantity toxic to insects, a compound described above.

---

This invention relates to new insecticidal compositions comprising an inert carrier and, as an essential active ingredient, in a quantity toxic to insects a compound of the formula

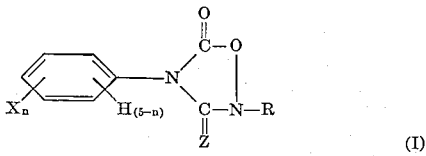

wherein R is selected from the group consisting of lower alkyl, lower alkenyl, and substituted lower alkyl wherein the substituent is a radical selected from the group consisting of halogen, lower alkoxy, benzyl, lower alkanoyl, carboxyalkyl and cyclohexyl; Z is selected from the group consisting of oxygen and sulfur; X is selected from the group consisting of halogen, lower alkyl, lower alkenyl, nitro, lower alkoxy, lower haloalkyl, di-(lower alkyl) amino, lower acylamino, N-lower alkyl-N-lower acylamino, lower alkylsulfoxide, lower alkylsulfone, cyano and thiocyano; and $n$ is an integer from 0 to 3.

In a preferred embodiment of this invention R is selected from the group consisting of lower alkyl, lower alkenyl, and substituted lower alkyl wherein the substituent is a radical selected from the group consisting of chlorine, bromine, methoxy, benzyl, acetyl, carboxymethyl, and cyclohexyl; Z is selected from the group consisting of oxygen and sulfur; X is selected from the group consisting of chlorine, bromine, lower alkyl, lower alkenyl, nitro, lower alkoxy, lower chloroalkyl, lower bromoalkyl, di-(lower alkyl) amino, lower acylamino, N-lower alkyl-N-lower acylamino, lower alkylsulfoxide, lower alkylsulfone, cyano and thiocyano; and $n$ is an integer from 0 to 3.

The term lower, for the purpose of this invention, is used to designate a branched or unbranched carbon chain containing up to six carbon atoms.

The insecticidally active compounds of the present invention can be prepared readily by reacting an appropriate urea or thiourea of the formula

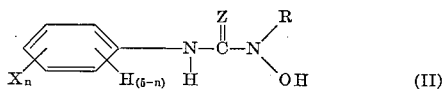

wherein R, Z, X and $n$ are as heretofore described, with an alkyl chloroformate such as ethyl chloroformate. This reaction can be conveniently carried out in aqueous base, such as aqueous sodium hydroxide solution, by slowly adding the alkyl chloroformate to the urea or thiourea at lower temperatures such as 5 to 20° C. with continuous stirring. The desired product can be recovered from the reaction mixture by methods common to the art such as filtration, decantation, extraction, washing, drying, recrystallizing, and the like.

Compounds having at least one X selected from the group consisting of lower alkylsulfoxides or lower alkylsulfones can be prepared by oxidation of the corresponding lower alkylthio compound by methods well known to the art.

The urea or thiourea compounds of Formula II, suitable as starting materials, can be prepared readily from a hydroxylamine of the formula

where R is as heretofore described, by reacting with an appropriate isocyanate or isothiocyanate of the formula

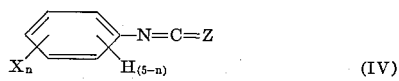

wherein Z, X and $n$ are as heretofore described. This reaction can be carried out by adding the isocyanate or isothiocyanate, of Formula IV, to a solution of the hydroxylamine of Formula III in a suitable solvent such as diethyl ether. Low temperatures are preferred for this reaction such as from about 0 to 20° C. The desired urea or thiourea can be used in the reaction solution as such, or can be recovered therefrom by precipitation upon adding a diluent such as pentane followed by filtration and drying.

Examplary urea and thiourea compounds suitable as starting materials for preparing the insecticidally active compounds of this invention are: 1-phenyl-3-methyl-3-hydroxyurea, 1 - phenyl - 3-methyl-3-hydroxythiourea, 1-phenyl - 3 - ethyl-3-hydroxyurea, 1-phenyl-3-isopropyl-3-hydroxyurea, 1 - phenyl - 3-isopropyl-3-hydroxythiourea, 1 - phenyl - 3-n-butyl-3-hydroxyurea, 1-(3'-chlorophenyl)-3 - methyl - 3-hydroxyurea, 1-(4'-chlorophenyl)-3-methyl-3 - hydroxythiourea, 1 - (3' - bromophenyl)-3-ethyl-3-hydroxyurea, 1-(3',4'-dichlorophenyl)-3-methyl-3-hydroxyurea, 1 - (3'-dimethylaminophenyl)-3-methyl-3-hydroxyurea, 1-(3'-chloro-4'-methylphenyl)-3-methyl-3-hydroxyurea, 1-(2'-bromo-4'-methylphenyl)-3-methyl-3-hydroxythiourea, 1 - (3'-chlorophenyl)-3-allyl-3-hydroxyurea, 1-(4' - bromophenyl)-3-chloromethyl-3-hydroxyurea, 1-phenyl - 3 - methoxyethyl - 3 - hydroxyurea, 1-(4'-chlorophenyl) - 3 - acetylmethyl - 3 - hydroxyurea, 1-(3'-nitrophenyl)-3-methyl-3-hydroxyurea, 1-(4'-methoxyphenyl)-3 - methyl - 3 - hydroxyurea, 1-(2',4'-dicyanophenyl)-3-methyl-3-hydroxyurea, 1-(3'-chloromethylphenyl)-3-allyl-3-hydroxyurea, 1-[4'-(N-methyl-N-acetylamino)-phenyl]-

3 - methyl-3-hydroxyurea, 1-(3',4'-dichlorophenyl)-3-carboxyethyl-3-hydroxyurea.

Exemplary suitable hydroxylamines for preparing the starting material ureas and thioureas are N-methyl hydroxylamine, N-ethyl hydroxylamine, N-n-propyl hydroxyl-amine, N-isopropyl hydroxylamine, N-n-butyl hydroxylamine, N-sec-butyl hydroxylamine, N-tert-butyl hydroxylamine, N-pentyl hydroxylamine, N-methoxyethyl hydroxylamine, N-ethoxymethyl hydroxylamine, N-allyl hydroxylamine, N-chloromethyl hydroxylamine, N-dibromo methyl hydroxylamine, N-benzylmethyl hydroxylamine, N-acetylmethyl hydroxylamine, N-carboxethyl hydroxylamine, N-cyclohexylmethyl hydroxylamine and the like.

Exemplary suitable isocyanates and isothiocyanates for preparing the starting material ureas and thioureas are phenyl isocyanate, phenyl isothiocyanate, 3-chlorophenyl isocyanate, 4-chlorophenyl isothiocyanate, 3,4-dichlorophenyl isocyanate, 3,4-dichlorophenyl isothiocyanate, 4-bromophenyl isocyanate, 4-bromophenyl isothiocyanate, 3-iodophenyl isocyanate, 4-fluorophenyl isocyanate, 3-chloro - 4 - bromophenyl isocyanate, 3-chloro-4-methylphenyl isocyanate, 3-chloro-4-ethylphenyl isothiocyanate, 3-methyl-4-bromophenyl isocyanate, 3-chloro-4-n-propylphenyl isocyanate, 3,4 - dichloro-5-methylphenyl isocyanate, 2,3-dichloro-4-cyanophenyl isocyanate, 4-thiocyanophenyl isocyanate, and the like.

The manner in which the insecticidally active compounds of the present invention can be prepared readily is illustrated in the following examples.

EXAMPLE 1

Preparation of 1-phenyl-3-ethyl-3-hydroxyurea

A solution of phenyl isocyanate (11.9 grams; 0.1 mol) in diethyl ether (30 ml.) is slowly added, with stirring, to a solution of N-ethyl hydroxylamine (6.1 grams; 0.1 mol) in diethyl ether (100 ml.) at room temperature. Stirring is continued for about 1 hour, during which time a precipitate is formed. The precipitate is removed from the reaction mixture by filtration, washed with pentane and dried to yield 1-phenyl-3-ethyl-3-hydroxyurea.

EXAMPLE 2

Preparation of 2-ethyl-4-phenyl-1,2,4-oxadiazolidine-3,5-dione 1-phenyl-3-ethyl-3-hydroxyurea (8.3 grams; 0.05 mol), prepared in Example 1, is dissolved in cooled dioxane (50 ml.), and a 2 N aqueous solution of sodium hydroxide (29 ml.) is added thereto. Ethyl chloroformate (4.8 ml.; 0.05 mol) is added dropwise, with stirring, at 10° to 15° C. The stirring is continued for a period of about 1 hour after the addition is completed. The reaction mixture is then poured into cold water and filtered to remove the precipitate. The precipitate is recrystallized to yield 2-ethyl-4-phenyl-1,2,4-oxadiazolidine-3,5-dione.

EXAMPLE 3

Preparation of 1-phenyl-3-isopropyl-3-hydroxyurea

A solution of phenyl isocyanate (10.0 g.; 0.084 mol) in diethyl ether (20 ml.) was added dropwise, with stirring to a solution of N-isopropyl hydroxylamine (6.3 grams; 0.084 mol) in diethyl ether (80 ml.) at room temperature. Stirring was continued for one hour, during which time a white precipitate was formed. The precipitate was removed from the reaction mixture, washed with pentane and dried to yield 1-phenyl-3-isopropyl-3-hydroxyurea (15.7 grams; 0.081 mol).

EXAMPLE 4

Preparation of 2-isopropyl-4-phenyl-1,2,4-oxadiazolidine-3,5-dione 1-phenyl-3-isopropyl-3-hydroxyurea (8.0 grams; 0.041 mol) prepared in Example 3, was dissolved in cooled dioxane (50 ml.) and a 2 N aqueous solution of sodium hydroxide (23.5 ml.; 0.047 mol) was added thereto. Ethyl chloroformate (4.3 ml.; 0.045 mol) was added dropwise at 10° to 15° C. with stirring. The stirring was continued for a period of about 1 hour after the addition was completed. The reaction mixture was poured into cold water and filtered to separate the precipitate. The precipitate was recrystallized from methanol to yield 2-isopropyl-4-phenyl-1,2,4-oxadiazolidine-3,5-dione as white needle-like crystals melting at 69–70° C. and having the following elemental analysis as calculated for $C_{11}H_{12}N_2O_3$:

Theoretical (percent): C, 59.99; H, 5.50; N, 12.72. Found (percent): C, 60.11; H, 5.72; N, 12.44.

EXAMPLE 5

Preparation of 1-phenyl-3-isopropyl-3-hydroxythiourea

A solution of phenyl isothiocyanate (10.0 grams; 0.074 mol) in diethyl ether (80 ml.) was slowly added with stirring to a solution of N-isopropyl hydroxylamine (5.6 grams; 0.075 mol) in diethyl ether (50 ml.) at room temperature. Stirring was continued for about 1 hour, during which time a precipitate formed. The precipitate was removed from the reaction mixture by filtration, washed with pentane and dried to yield 1-phenyl-3-isopropyl-3-hydroxythiourea as a pale yellow solid.

EXAMPLE 6

Preparation of 2-isopropyl-4-phenyl-3-thiono-5-oxo-1,2,4-oxadiazolidine 1-phenyl - 3 - isopropyl-3-hydroxythiourea (8.0 grams; 0.038 mol), prepared in Example 5, was dissolved in cooled dioxane (80 ml.) and a 2 N aqueous solution of sodium hydroxide (22 ml.) was added thereto. Ethyl chloroformate (4.0 ml.; 0.942 mol) was added dropwise at 10° to 15° C. with stirring. The stirring was continued for a period of about 1 hour after the addition was completed. The reaction mixture was poured into cold water and filtered to separate the precipitate. The precipitate was recrystallized from methanol, dried under vacuum and recrystallized a second time from a benzene-hexane mixture to yield 2-isopropyl-4-phenyl-3-thiono-5-oxo-1,2,4-oxadiazolidine as white needle-like crystals having melting point of 129° to 130° C. and having the following elemental analysis as calculated for $C_{11}H_{12}N_2O_2S$:

Theoretical (percent): C, 55.94; H, 5.13; S, 13.56. Found (percent): C, 55.81; H, 5.44; S, 13.52.

EXAMPLE 7

Preparation of 1-(3',4'-dichlorophenyl)-3-isopropyl-3-hydroxyurea

A solution of 3,4-dichlorophenyl isocyanate (12 grams; 0.064 mol) in diethyl ether (60 ml.) was slowly added, with stirring, to a solution of N-isopropyl hydroxylamine (4.8 grams; 0.064 mol) in diethyl ether (50 ml.) at room temperature. Stirring was continued for about 1 hour, during which time a precipitate formed. The precipitate was isolated by evaporating the diethyl ether, washed with hexane and dried to yield 1-(3'-4'-dichlorophenyl)-3-isopropyl-3-hydroxyurea.

EXAMPLE 8

Preparation of 2-isopropyl-4-(3',4'-dichlorophenyl)-1,2,4-oxadiazolidine-3,5-dione 1 - (3',4' - dichlorophenyl) - 3 - isopropyl - 3 - hydroxyurea (8.0 grams; 0.03 mol), prepared in Example 7, was dissolved in cooled dioxane (60 ml.) and 2 N aqueous sodium hydroxide (17.5 ml.) was added thereto. Ethyl chloroformate (3.2 ml.; .03 mol) was added dropwise at 10° to 15° C. with stirring. The stirring was continued for a period of about 1 hour after the addition was completed. The reaction mixture was poured into cold water and filtered to separate the precipitate. The precipitate was first recrystallized from methanol and then re-recrystallized from acetonitrile to yield 2-isopropyl-4-(3', 4'-dichlorophenyl)-1,2,4-oxadiazolidine - 3,5 - dione as a white solid having a melting point of 95° to 95.5° C. and having the following elemental analysis as calculated for $C_{11}H_{10}Cl_2N_2O_3$:

Theoretical (percent): C, 45.72; H, 3.48; Cl, 24.53.
Found (percent): C, 45.83; H, 3.75; Cl, 24.34.

EXAMPLE 9

Preparation of 1-(3'-chloro-4'-ethylphenyl)-3-ethyl-3-hydroxyurea

A solution of 3-chloro-4-ethylphenyl isocyanate (15.7 grams; 0.01 mol) in diethyl ether (100 ml.) is slowly added, with stirring, to a solution of N-ethyl hydroxylamine (6.1 grams; 0.1 mol) in diethyl ether at room temperature. Stirring is continued for about 1 hour during which time a precipitate is formed. The precipitate is removed from the reaction mixture by filtration, washed with pentane and dried to yield 1-(3'-chloro-4'-ethylphenyl)-3-ethyl-3-hydroxyurea.

EXAMPLE 10

Preparation of 2-ethyl-4-(3'-chloro-4'-ethylphenyl)-1,2,4-oxadiazolidine-3,5-dione 1 - (3' - chloro - 4' - ethylphenyl) - 3 - ethyl - 3 - hydroxyurea (10.7 grams; 0.05 mol), prepared in Example 9, is dissolved in cooled dioxane (100 ml.) and a 2 N aqueous sodium hydroxide (29.2 ml.) is added thereto. Ethyl chloroformate (5.4 ml.; 0.05 mol) is added dropwise, at 10° to 15° C., with stirring. The stirring is continued for a period of about 1 hour after the addition is completed. The reaction mixture is poured into cold water and filtered to separate the precipitate. The precipitate is recrystallized and dried to yield 2-ethyl-4-(3'-chloro-4'-ethylphenyl)-1,2,4-oxadiazolidine-3,5-dione.

EXAMPLE 11

Preparation of 1-phenyl-3-chloromethyl-3-hydroxyurea

A solution of phenyl isocyanate (11.9 grams; 0.1 mol) in diethyl ether (30 ml.) is slowly added, with stirring, to a solution of N-chloromethylhydroxylamine (8.2 grams; 0.1 mol) in diethyl ether (100 ml.) at room temperature. Stirring is continued for about 1 hour during which time a precipitate is formed. The precipitate is removed from the reaction mixture by filtration, washed with pentane and dried to yield 1-phenyl-3-chloromethyl-3-hydroxyurea.

EXAMPLE 12

Preparation of 2-chloromethyl-4-phenyl-1,2,4-oxadiazolidine-3,5-dione 1-phenyl-3-chloromethyl-3-hydroxyurea (20.0 grams; 0.1 mol) prepared in Example 11, is dissolved in cooled dioxane (100 ml.) and a 2 N aqueous solution of sodium hydroxide (50 ml.) is added thereto. Ethyl chloroformate (9.6 ml.; 0.1 mol) is then added dropwise, with stirring, at 10° to 15° C. The stirring is continued for a period of about 1 hour after the addition iscompleted. The reaction mixture is then poured into cold water and filtered to remove the precipitate which has formed. The precipitate is recrystallized to yield 2-chloromethyl-4-methyl-1,2,4-oxadiazolidine-3,5-dione.

EXAMPLE 13

Preparation of 1-(4'-chlorophenyl)-3-(β-methoxyethyl)-3-hydroxyurea

A solution of 4-chlorophenyl isocyanate (15.3 grams; 0.1 mol) in diethyl ether (50 ml.) is slowly added, with stirring, to a solution of N-β-methoxyethyl hydroxylamine (9.1 grams; 0.1 mol) in diethyl ether (100 ml.) at room temperature. Stirring is continued for a period of about 1 hour during which time a precipitate is formed. The precipitate is removed from the reaction mixture by filtration, washed with pentane and dried to yield 1-(4'-chlorophenyl)-3-(β-methoxyethyl)-3-hydroxyurea.

EXAMPLE 14

Preparation of 2-(β-methoxyethyl)-4-(4'-chlorophenyl)-1,2,4-oxadiazolidine-3,5-dione 1-(4'-chlorophenyl)-3-(β - methoxyethyl)-3- hydroxyurea (12.2 grams; 0.05 mol) prepared in Example 13, is dissolved in cooled dioxane (80 ml.) and a 2 N aqueous solution of sodium hydroxide (30 ml.) is added thereto. Ethyl chloroformate (4.8 ml.; 0.05 mol) is then added dropwise, with stirring at 10° to 15° C. The stirring is continued for a period of about 1 hour after the addition is completed. The reaction mixture is then poured into cold water and filtered to remove the precipitate which has formed. The precipitate is recrystallized to yield 2-(β-methoxyethyl) - 4-(4'-chlorophenyl)-1,2,4-oxadiazolidine-3,5-dione.

EXAMPLE 15

Preparation of 1-(2'-methoxy-3',4'-dichlorophenyl)-3-methyl-3-hydroxyurea

A solution of 2-methoxy-3,4-dichlorophenyl isocyanate (21.8 grams; 0.1 mol) in diethyl ether (50 ml.) is slowly added, with stirring, to a solution of N-methyl hydroxylamine (4.7 grams; 0.1 mol) in diethyl ether (100 ml.) at room temperature. Stirring is continued for a period of about 1 hour during which time a precipitate is formed. The precipitate is removed from the reaction mixture by filtration, washed with pentane and dried to yield 1-(2' - methoxy-3',4'-chlorophenyl)-3-methyl-3-hydroxyurea.

EXAMPLE 16

Preparation of 2-methyl-4-(2'-methoxy-3',4'-dichlorophenyl)-1,2,4-oxadiazolidine-3,5-dione 1-(2'-methoxy-3',4'-dichlorophenyl) - 3 - methyl-3-hydroxyurea (13.2 grams; 0.05 mol), prepared in Example 15, is dissolved in cooled dioxane (80 ml.) and a 2 N aqueous solution of sodium hydroxide (30 ml.) is added thereto. Ethyl chloroformate (4.8 ml.; 0.05 mol) is then added dropwise, with stirring, at 10° to 15° C. The stirring is continued for a period of about 1 hour after the (11.1 grams; 0.05 mol), prepared in Example 17, is dispoured into cold water and filtered to remove the precipitate which has formed. The precipitate is recrystallized to yield 2-methyl-4-(2'-methoxy - 3',4' - dichlorophenyl)-1,2,4-oxadiazolidine-3,5-dione.

EXAMPLE 17

Preparation of 1-(3'-acetylaminophenyl)-3-methyl-3-hydroxyurea

A solution of 3-acetylaminophenyl isocyanate (17.6 grams; 0.1 mol) in diethyl ether (10.0 ml.) is slowly added, with stirring, to a solution of N-methyl hydroxylamine (4.7 grams; 0.1 mol) in diethyl ether (100 ml.) at room temperature. Stirring is continued for one hour, during which time a precipitate is formed. The precipitate is removed from the reaction mixture by filtration, washed with pentane and dried to yield 1-(3'-acetylaminophenyl)-3-methyl-3-hydroxyurea.

EXAMPLE 18

Preparation of 2-methyl-4-(3'-acetylaminophenyl)-1,2,4-oxadiazolidine-3,5-dione 1-(3'-acetylaminophenyl)-3-methyl - 3 - hydroxyurea (11.1 grams; 0.5 mol), prepared in Example 17, is dissolved in cooled dioxane (50 ml.) and a 2 N aqueous solution of sodium hydroxide (30 ml.) is added thereto. Ethyl chloroformate (4.8 ml.; 0.05 mol) is added dropwise, with stirring, at 10° to 15° C. The stirring is continued for a period of about 1 hour after the addition is completed. The reaction mixture is then poured into cold water and filtered to remove the precipitate. The precipitate is recrystallized to yield 2-methyl-4-(3'-acetylaminophenyl)-1,2,4-oxadiazolidine-3,5-dione.

Other insecticidally active compounds within the scope of the present invention can be prepared by the procedures described in the foregoing examples. Presented in the following examples are the essential ingredients required to prepare the indicated named compounds according to the procedures heretofore described.

EXAMPLE 19

4-chlorophenyl isocyanate+N-ethyl hydroxylamine+ sodium hydroxide+ethyl chloroformate=2-ethyl-4-(4'-chlorophenyl)-1,2,4-oxadiazolidine-3,5-dione.

EXAMPLE 20

3 - chlorophenyl isothiocyanate+N-methyl hydroxylamine + sodium hydroxide + ethyl chloroformate = 2-methyl-4-(3' - chlorophenyl)-3-thiono-5-oxo-1,2,4-oxadiazolidine.

EXAMPLE 21

3,4-dibromophenyl isocyanate+N-n-propyl hydroxylamine+sodium hydroxide+ethyl chloroformate=2 - n-propyl-4-(3',4'-dibromophenyl)-1,2,4 - oxadiazolidine-3,5-dione.

EXAMPLE 22

3-bromo-4-ethylphenyl isothiocyanate+N-methyl hydroxylamine+sodium hydroxide+ethyl chloroformate= 2 - methyl-4-(3'-bromo-4' - ethylphenyl)-3-thiono-5-oxo-1,2,4-oxadiazolidine.

EXAMPLE 23

3,4,5-trichlorophenyl isocyanate+N-methyl hydroxylamine + sodium hydroxide + ethyl chloroformate = 2-methyl 4-(3',4',5'-trichlorophenyl)-1,2,4 - oxadiazolidine-3,5-dione.

EXAMPLE 24

4-chlorophenyl isocyanate+N-methyl hydroxylamine+ sodium hydroxide+ethyl chloroformate=2-methyl-4-(4'-chlorophenyl)-1,2,4-oxadiazolidine-3,5-dione.

EXAMPLE 25

3,4-dichlorophenyl isocyanate+N-β-carboxyethyl hydroxylamine+sodium hydroxide+ethyl chloroformate= 2-(β-carboxyethyl)-4-(3',4'-dichlorophenyl) - 1,2,4 - oxadiazolidine-3,5-dione.

EXAMPLE 26

3-tolyl isocyanate+N-benzylmethyl hydroxylamine+ sodium hydroxide+ethyl chloroformate=2 - (benzylmethyl)-4-(3'-methylphenyl - 1,2,4 - oxadiazolidine-3,5-dione.

EXAMPLE 27

4-bromophenyl isocyanate+N-acetylmethyl hydroxylamine+sodium hydroxide+ethyl chloroformate=2-(acetylmethyl)-4-(4'-bromophenyl) - 1,2,4 - oxadiazolidine-3,5-dione.

EXAMPLE 28

4 - thiocyanophenyl isocyanate+N-chloromethyl hydroxylamine+sodium hydroxide+ethyl chloroformate= 2-(chloromethyl)-4-(4'-thiocyanophenyl) - 1,2,4 - oxadiazolidine-3,5-dione.

EXAMPLE 29

4-(N-methyl-N-ethylamino)-phenyl isothiocyanate+N-allyl hydroxylamine+sodium hydroxide+ethyl chloroformate=2-allyl - 4 - [4' - (N-methyl-N-ethylamino)-phenyl]-3-thiono-5-oxo-1,2,4-oxadiazolidine.

EXAMPLE 30

4-(methylsulfinyl)-phenyl isocyanate+N-methyl hydroxylamine+sodium hydroxide+ethyl chloroformate= 2-methyl-4-[4'-(methylsulfinyl)-phenyl] - 1,2,4 - oxadiazolidine-3,5-dione.

EXAMPLE 31

4-nitrophenyl isocyanate+N-methyl hydroxylamine+ sodium hydroxide+ethyl chloroformate=2-methyl-4-(4'-nitrophenyl)-1,2,4-oxadiazolidine-3,5-dione.

EXAMPLE 32

3-chloro-4-methoxyphenyl isocyanate+N-methyl hydroxylamine+sodium hydroxide+ethyl chloroformate= 2-methyl-4-(3'-chloro - 4' - methoxyphenyl)-1,2,4-oxadiazolidine-3,5-dione.

EXAMPLE 33

3-chloro-4-chloromethylphenyl isocyanate+N-ethyl hydroxylamine+sodium hydroxide+ethyl chloroformate= 2-ethyl-4-(3'-chloro-4'-chloromethylphenyl) - 1,2,4 - oxadiazolidine-3,5-dione.

EXAMPLE 34

4 - (N-methyl-N-acetylamino)-phenyl isocyanate+N-methyl hydroxylamine+sodium hydroxide+ethyl chloroformate=2-methyl - 4 - [4'-(N-methyl-N-acetylamino)-phenyl]-1,2,4-oxadiazolidine-3,5-dione.

Additional insecticidally active compounds within the scope of this invention, which can be prepared as heretofore described, are: 2-n-propyl - 4 - phenyl-1,2,4-oxadiazolidine-3,5-dione, 2-ethyl-4-phenyl - 3 - thiono-5-oxo-1,2,4 - oxadiazolidine, 2-n-butyl-4-phenyl-1,2,4-oxadiazolidine-3,5-dione, 2-n-butyl - 4 - phenyl-3-thiono-5-oxo-1,2,4-oxadiazolidine, 2-methyl-4-(4'-fluorophenyl) - 1,2,4 - oxadiazolidine-3,5-dione, 2 - methyl-4-(3'-iodophenyl)-1,2,4-oxadiazolidine - 3,5 - dione, 2-methyl-4-(2',3'-dichloro-4'-methylphenyl)-1,2,4-oxadiazolidine-3,5-dione, 2-methyl-4-(2'-chloro-3',5'-dimethylphenyl) - 1,2,4 - oxadiazolidine-3,5-dione, 2-ethyl-4-(3',4'-dichlorophenyl) - 3 - thiono-5-oxo - 1,2,4 - oxadiazolidine, 2-ethyl-4-(3',4',5'-tribromophenyl) - 1,2,4 - oxadiazolidine - 3,5 - dione, 2-sec-butyl-4-(3'-chloro - 4' - ethylphenyl) - 1,2,4 - oxadiazolidine-3,5-dione, 2 - ethyl-4-(3'-chloro - 4' - bromophenyl)-1,2,4 - oxadiazolidine - 3,5 - dione, 2 - trichloromethyl-4 - (3',4'-dichlorophenyl - 1,2,4 - oxadiazolidine - 3,5-dione, 2-methyl - 4 - (3'-cyanophenyl) - 1,2,4 - oxadiazolidine - 3,5 - dione, 2 - allyl-4-(3'-4'-dichlorophenyl)-1,2,4 - oxadiazolidine - 3,5 - dione, 2 - allyl-4-(4'-chlorophenyl)-3-thiono-5-oxo - 1,2,4 - oxadiazolidine, 2-(β-carboxyethyl)-4-(3',4'-dichlorophenyl) - 3 - thiono - 5 - oxo-1,2,4-oxadiazolidine, 2-methyl-4-(3',4'-dimethylphenyl)-3-thiono-5-oxo-1,2,4-oxadiazolidine, 2 - methyl-4-(3'-diethylaminophenyl)-3-thiono-5-oxo - 1,2,4 - oxadiazolidine, 2-methyl-4-[4'-(methylsulfonyl)-phenyl]-3-thiono - 5 - oxo-1,2,4-oxadiazolidine, 2-methyl - 4 - [3'-(methylsulfonyl)-phenyl]-3-thiono-5-oxo-1,2,4-oxadiazolidine, and the like.

For practical use as insecticides, the compounds of this invention are generally incorporated into insecticidal compositions which comprise an inert carrier and an insecticidally toxic amount of such a compound. Such insecticidal compositions, which can also be called formulations, enable the active compound to be applied conveniently to the site of the insect infestation in any desired quantity. These compositions can be solids such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides can be dispersed under superatmospheric pressure as aerosols. However, preferred liquid insecticidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the insect infestation. The emulsifiers most commonly used in these concentrates are nonionic or mixtures of nonionic with anionic surface-active agents.

A typical insecticidal composition according to this invention is illustrated by the following example, in which the quantities are in parts by weight.

EXAMPLE 35

Preparation of a dust

Product of Example 2 _____ 10
Powdered talc _____ 90

The above ingredients are mixed in a mechanical grinder-blender and are ground until a homogenous, free-flowing dust of the desired particle size is obtained. This dust is suitable for direct application to the site of the insect infestation.

The compounds of this invention can be applied as insecticides in any manner recognized by the art. One method for destroying insects comprises applying to the locus of the insect infestation an insecticidal composition comprising an inert carrier and as the essential active ingredient, in a quantity which is toxic to said insects, a compound of the present invention. The concentration of the new compounds of this invention in the insecticidal compositions will vary greatly with the type of formulation and the purpose for which it is designed, but generally the insecticidal compositions will comprise from about 0.05 to about 95 percent by weight of the active compounds of this invention. In a preferred embodiment of this invention, the insecticidal compositions will comprise from about 5 to 75 percent by weight of the active compound. The compositions can also comprise such additional substances as other pesticides, stabilizers, spreaders, deactivators, adhesives, stickers, fertilizers, activators, synergists, and the like.

The compounds of the present invention are also useful when combined with other insecticides in the insecticidal compositions heretofore described. These other insecticides can comprise from about 5 percent to about 95 percent of the active ingredients in the insecticidal compositions. Use of the combinations of these other insecticides with the compounds of the present invention provide insecticidal compositions which are more effective in controlling insects and often provide results unattainable with separate compositions of the individual insecticides. The other insecticides with which the compounds of this invention can be used in the insecticidal compositions to control insects, can include halogenated compounds such as DDT, methoxychlor, TDE, lindane, chlordane, isobenzan, aldrin, dieldrin, heptachlor, endrin, mirex, endosulfon, dicofol, and the like; organic phosphorus compounds such as TEPP, schradan, ethion, parathion, methyl parathion, EPN, demeton, carbophenothion, phorate, zinophos, diazinon, malathion, mevinphos, dimethoate, DBD, ronnel, oxydemeton-methyl, dicapthon, chlorothion, phosphamidon, naled, fenthion, trichlorofon, DDVP, and the like; organic nitrogen compounds such as dinitro-o-cresol, dinitrocyclohexylphenol, DNB, DNP, binapacril, azobenzene, and the like; organic carbamate compounds such as carbaryl, ortho 5353, and the like; organic sulfur compounds such as phenothiazine, phenoxathin, lauryl thiocyanate, [bis(2 - thiocyanoethyl) ether], isobornyl thiocyanoacetate, and the like; as well as such substances usually referred to as fumigants, as hydrogen cyanide, carbon tetrachloride, calcium cyanide, carbon disulfide, ethylene dichloride, propylene dichloride, ethylene dibromide, ethylene oxide, methyl bromide, paradichlorobenzene, and the like.

The compounds of the present invention can also be combined with fungicidal and nematocidal chemical compounds to form pesticidal compositions useful for the control of fungi and in some cases soil nematodes as well as insects. Typical examples of such fungicidal chemical compounds are ferbam, nabam, zineb, ziram, thiram, chloranil, dichlone, glyodin, cycloheximide, dinocap, maneb, captan, dodine, PCNB, p-dimethylaminobenzenediazo sodium sulfonate and the like; while examples of nematocidal compounds are chloropicrin, O,O-diethyl O-(2,4 - dichlorophenyl) phosphorothioate, tetrachlorothiophene, dazomet, dibromochloropropane, and the like.

The compounds of this invention can be used in many ways for the control of insects. Insecticides which are to be used as stomach poisons or protective materials can be applied to the surface on which the insects feed or travel. Insecticides which are to be used as contact poisons or eradicants can be applied directly to the body of the insect, as a residual treatment to the surface on which the insect may walk or crawl, or as a fumigant treatment of the air which the insect breathes. In some cases, the compounds applied to the soil or plant surfaces are taken up by the plant, and the insects are poisoned systemically.

The above methods of using insecticides are based on the fact that almost all the injury done by insects is a direct or indirect result of their attempts to secure food. Indeed, the large number of destructive insects can be classified broadly on the basis of their feeding habits. Among the insects which can be effectively controlled by the compounds of the present invention are the chewing insects such as the Mexican bean beetle, the southern armyworm; the piercing-sucking insects, such as the pea aphid, the cereal leaf beetle, the housefly, the grape leafhopper, the chinch bug, the lygus bugs, oyster shell scale, the California red scale, the Florida red scale, the soft scale and mosquitoes; the internal feeders, including borers such as the European corn borer, the peach twig borer and the corn earworm, worms or weevils such as the codling moth, alfalfa weevil, cotton boll weevil, pink boll worm, plum curculio, red banded leaf roller, melon worm, cabbage looper and apple maggot, leaf miners such as the apple leaf miner, birch leaf miner and beet leaf miner, and gall insects such as the wheat joint worm and the grape phylloxera. Insects which attack below the surface of the ground are classified as subterranean insects and include such destructive pests as the wooly apple aphid, the Japanese beetle, the onion maggot and the corn rootworm.

Mites and ticks are not true insects. Many economically important species of mites and ticks can be controlled by the compounds of this present invention such as the red spider mite, the two spotted mite, the strawberry spider mite, the citrus rust mite, the cattle tick, the poultry mite, the citrus red mite and the European red mite. Chemicals useful for the control of mites are often called miticides, while those useful for the control of both mites and ticks are known specifically as acaracides.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of a light infestation of an insect under conditions unfavorable for its feeding, while a pound or more of active compound per acre may be required for the control of a heavy infestation of insects under conditions favorable to their development.

The insecticidal activity of the compounds of this invention can be illustrated in various experiments recognized by the art. In one experiment carried out for the control of insects by feeding, the test compound was formulated by dissolving the compound in acetone and dispersing the acetone solution in distilled water containing small amounts of emulsifiers. Henderson bush lima bean leaves were then dipped into the above formulation and were each fed to 10 third instar Mexican bean beetle larvae for a feeding period of 48 hours. After this period the mortality was observed. In this experiment the compound 2 - isopropyl - 4 - phenyl - 1,2,4 - oxadiazolidine - 3,5-dione gave 100% control of the Mexican bean beetle at a concentration of both 3500 and 1000 parts per million.

I claim:

1. An insecticidal composition comprising an inert carrier and, as an essential active ingredient, an insecticidally effective amount of a compound of the formula:

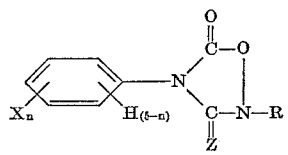

wherein R is selected from the group consisting of lower alkyl, lower alkenyl and substituted lower alkyl wherein the substituent is a radical selected from the group consisting of halogen, lower alkoxy, benzyl, lower alkanoyl, carboxyloweralkyl, and cyclohexyl; Z is selected from the group consisting of oxygen and sulfur; X is selected from the group consisting of halogen, lower alkyl, lower alkenyl, nitro, lower alkoxy, lower haloalkyl, di-(lower alkyl)-amino, loweralkyl carbonylamino, N-lower alkyl-N-lower alkyl carbonylamino, lower alkylsulfoxide, lower alkylsulfone, cyano and thiocyano; and $n$ is an integer from 0 to 3.

2. A method for destroying insects which comprises applying to said insects an insecticidal composition of claim 1.

3. The method of claim 2 wherein the active ingredient is 2 - isopropyl - 4 -phenyl - 1,2,4 - oxadiazolidine - 3,5-dione.

4. The method of claim 2 wherein the active ingredient is 2 - methyl - 4 - (3' - chlorophenyl) - 1,2,4 - oxadiazolidine-3,5-dione.

5. The method of claim 2 wherein the active ingredient is 2 - methyl - 4 - (3',4' - dichlorophenyl) - 1,2,4 - oxadiazolidine-3,5-dione.

6. The method of claim 2 wherein the active ingredient is 2 - methyl - 4 - (3' - chloro - 4' - methylphenyl) - 3 - thiono-5-oxo-1,2,4-oxadiazolidine.

7. The method of claim 2 wherein the active ingredient is 2 - methyl - 4 - (2' - methoxy - 3',4' - dichlorophenyl) - 1,2,4 - oxadiazolidine - 3,5 - dione.

8. The method of claim 2 wherein the active ingredient is 2 - allyl - 4 - [4' - (N - methyl - N - ethylamino)-phenyl]-3-thiono-5-oxo-1,2,4-oxadiazolidine.

References Cited

UNITED STATES PATENTS 2,424,199   7/1947   Horst _____ 424—272
2,833,689   5/1958   Gerjovich _____ 424—272

ALBERT T. MEYERS, Primary Examiner

D. R. ORE, Assistant Examiner

U.S. Cl. X.R.

260—307, 453, 454; 424—46, 357

PO-1050
(5/69)

UNITED STATES PATENT OFFICE
CERTIFICATE OF CORRECTION

Patent No. 3,505,454            Dated April 7, 1970

Inventor(s) John Krenzer

It is certified that error appears in the above-identified patent and that said Letters Patent are hereby corrected as shown below:

Col. 2, line 52, "Examplary" should read --Exemplary--
Col. 5, line 40, "ef" should read --of--
Col. 6, line 44, delete line 44, and insert --addition is completed. The reaction mixture is then--.

SIGNED AND
SEALED

AUG 4 - 1970

(SEAL)
Attest:

Edward M. Fletcher, Jr.

Attesting Officer

WILLIAM E. SCHUYLER, JR.
Commissioner of Patents